Jan. 5, 1954   M. W. BRAINARD   2,665,334
DRY PLATE TYPE RECTIFIER
Filed April 9, 1951   4 Sheets-Sheet 1

INVENTOR.
Maurice W. Brainard
BY
Attorney

Jan. 5, 1954 M. W. BRAINARD 2,665,334
DRY PLATE TYPE RECTIFIER
Filed April 9, 1951 4 Sheets-Sheet 4

INVENTOR.
Maurice W. Brainard
BY
Attorney

Patented Jan. 5, 1954

2,665,334

UNITED STATES PATENT OFFICE 2,665,334

DRY PLATE TYPE RECTIFIER

Maurice W. Brainard, Los Angeles, Calif., assignor of one-half to O'Keefe & Merritt Company, Los Angeles, Calif., a corporation of California Application April 9, 1951, Serial No. 220,020

19 Claims. (Cl. 317—234)

This invention has to do with a dry plate type rectifier that can be used stationary or in a fixed position or in a rotary machine such as a generator, and it is a general object of the invention to provide a rectifier of the dry plate type which is of simple, practical and improved construction.

Rectifiers of the dry plate type and such as to operate in generators or the like to convert alternating current output from exciters into direct current for fields, involve a plurality of electrical elements that must be accurately connected in the circuit involved and certain of the elements are delicate and are subject to injury or impairment through handling and may even be adversely affected by moisture.

The structure provided by this invention can be employed or utilized in electrical apparatus or systems generally and it may be employed so it is stationary or so that it moves. For the purpose of example the present invention will be referred to as a unit applied to or incorporated in an electric machine in the nature of an electric generator which generator has a rotor carrying an element of an exciter delivering alternating current which is usually three phase, and has a field to be excited by direct current. The unit or rectifier provided by the present invention may be considered as carried by and operating with the rotor of the generator and receives the alternating current and delivers direct current. More specifically, the machine or generator has a rotor with a center shaft and the unit or rectifier of the present invention is applied to an end of the shaft, lead wires to and from the rectifier being carried inside the shaft.

A further object of the present invention is to provide a rectifier of the general character referred to in which the delicate or sensitive parts are located wholly within a casing-like construction formed by rugged parts, to the end that they are protected against being contacted from the exterior of the structure and also against moisture or dampness such as might affect the parts.

A general object of the present invention is to provide a simple, practical improved mounting by which a unitary structure in the form of a rectifier is applied to the end of a rotor shaft or other suitable support and is electrically connected with wires carried in or passing through the shaft.

It is a further object of the present invention to provide a rectifier of the general character referred to in which the various essential parts are so arranged and related as to effectively distribute and dissipate heat generated in the course of operation.

It is another object of the invention to provide a rectifier of the general character referred to which is in the nature of a unit or unitary structure that can be permanently assembled ready for use, and thereafter applied to a suitable support or to a generator or rotary machine without requiring the exercise of skill or unusual training, and without danger of misapplication.

It is a further object of the present invention to provide a rectifier of the general character referred to which is in the nature of a unit that can be readily handled separate from the supported or related machine, and which can be effectively sealed against injury and moisture while detached from the machine by the mere application of a simple closure thereto.

It is another object of this invention to provide a rectifier of the general character referred to in which the various parts are related or keyed to each other and are coupled by engaging one another so that danger of error in assembly of the parts is minimized and the structure as a whole involves a minimum number of connections, fasteners, or other devices requiring operation or manipulation in the course of assembly and in the course of application of the rectifier to the rotary machine or other support.

In a typical application of the rectifier where it is to move or rotate, it is incorporated in a generator, or the like, and is applied to the end of the generator shaft. The rectifier involves, generally, a frame in the form of an electrical conducting disc or plate having a central shaft receiving socket and having contact means on its front side. A forward conducting disc or plate is preferably flat and spaced axially from the frame and, in the case of multi-phase operation, has a plurality of rectifying elements or layers of selenium, or the like commonly referred to as semi-conductor for active elements, on its rear side to oppose the frame. It will be understood, of course, that in the case of single-phase operation there need be only a single rectifying layer or element on the disc. In the usual case of a plurality of the rectifying layers on the disc, they are preferably circumferentially spaced. Peripheral connecting means joins the frame and the forward plate and involves an insulator that electrically separates the frame and forward plate. In a preferred embodiment for multiphase operation, plates of base metal, referred to as segmental, occur between the frame and forward plate and are carried by a mounting means so that they are circumferentially spaced and are parallel with the frame and forward plate. The mounting means for the segmental plates involves outer supports, preferably blocks of insulation holding the segmental plates at their outer peripheral portions while inner mounting means, preferably spacers of insulation, hold the segmental plates where they approach the central axis of the rectifier. A rectifying element or layer, or a plurality of spaced rectifying elements or layers in the case of multiphase operation, of selenium, or the like, are provided on the rear sides of the segmental plates and oppose and are in direct contact with the contacts on the frame. Means electrically connect the rectifying elements or layers on the forward plate with the segmental plates and preferably involve contacts between these parts in the form of corrugated flexible sheets of metal with crest portions in pressure engagement with the rectifying elements and with the segmental plates. Electrical coupling means connect wires in the shaft carrying the rectifier with the electrical elements of the rectifier, there being input wires carrying the three-phase alternating circuit connected by the electrical coupling means to the segmental plates, and there need be only a single output wire connected to the forward plate to carry one side of the direct current circuit, as the other side of that circuit may be grounded. A mounting means releasably supports or mounts the rectifier on the end of the shaft and when in operation or engaged it holds the various elements of the rectifier occurring at the central portion thereof in pressure and sealed engagement.

The various objects and features of my invention will be fully understood from the following detailed description of a typical preferred form and application of the invention, throughout which description reference is made to the accompanying drawings, in which.

The rectifier embodying the present invention is adapted to be employed in electric machines or apparatus, and since it is particularly useful and practical in or as an element of an electric generator, I have illustrated it in this connection. It is to be understood, however, that the structure that I have provided is not limited to use where it moves or rotates.

Figure 1:
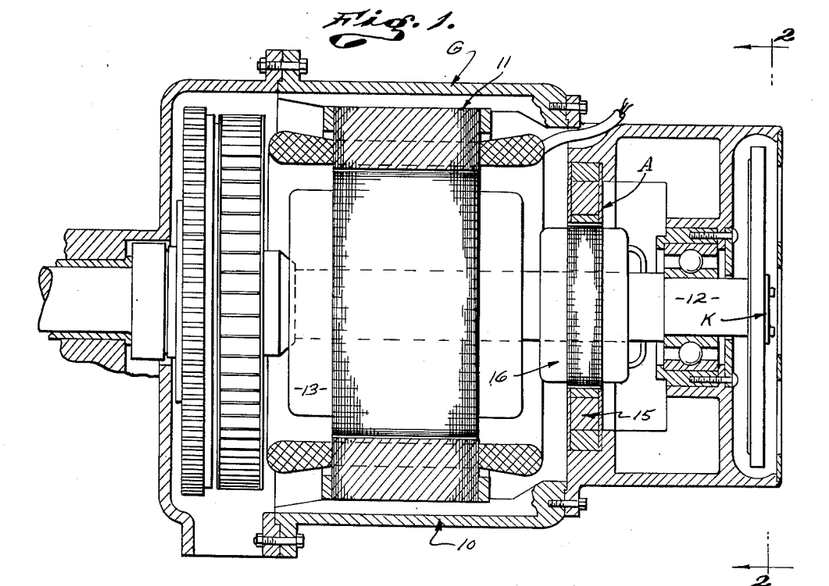
Fig. 1 is a longitudinal sectional view of an electric machine in the form of an electric generator with a rotor carrying a rectifier embodying the present invention.
Figure 2:
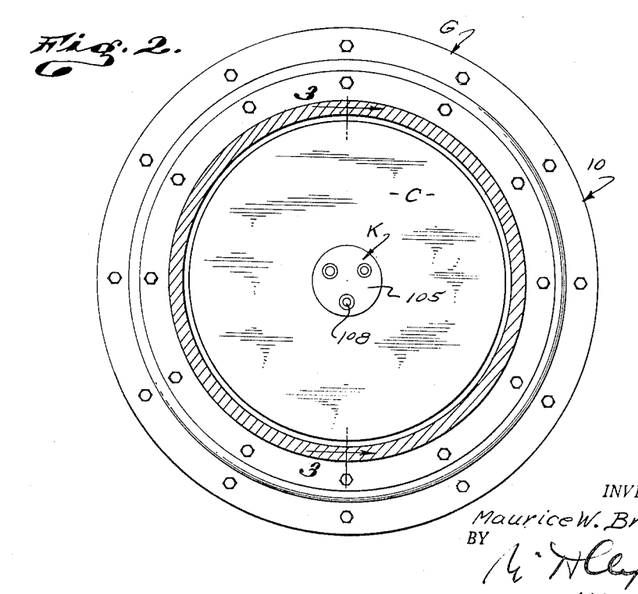
Fig. 2 is a section of the structure shown in Fig. 1, being a view taken as indicated by line 2—2 on Fig. 1.

The particular generator G illustrated in the drawings involves a suitable case or housing 10 carrying a suitable stator or armature 11. A rotor operates in the case 10 and involves, generally, a shaft 12 supporting suitable field elements 13 within the armature 11.

In the particular machine illustrated, an exciter A is incorporated in the machine and involves a field element 15 fixed in the case 10 and a rotor 16 carried on the shaft 12 and operating within the field 15. For purpose of example, I have shown an exciter delivering a three-phase alternating current and the output or circuit from the exciter A is carried by wires X, Y and Z which extend through a central opening 18 in the shaft 12 to the end of the shaft at which I locate the rectifier. It will be apparent that the exciter may be such as to deliver any desired multiphase alternating current or single-phase alternating current as circumstances may require.

It is to be understood that the machine or generator, considered as a whole, may include various features of construction or devices common to or desirable in a machine of this character, as, for instance, the shaft may be carried in suitable anti-friction bearings and the structure may include means operating to circulate air through the casing, etc.

The rectifier, as provided by the present invention, is essentially a unitary or self-contained structure and it is applicable to a support, say to the motor shaft 12, preferably to an end of the shaft where it is electrically connected to wires carried in the shaft and serves to receive the alternating current from the exciter A and to deliver direct current for energization of the field element 13. When I use the term "shaft" in referring to the part or support to which the rectifier is applied, I intend that the term be applied to any part or structure that may be used as a mounting.

The rectifier, as provided by the present invention, has a main element which I will term a frame B which is preferably in the form of a flat, round, or disc-shaped plate with a central shaft-receiving socket 20. The frame B, as employed in my construction, is an electrical conductor and I therefore form it of metal of high conductivity. In the preferred arrangement the socket 20 at the center of the frame B receives and has direct mechanical and electrical contact with the end portion of the motor shaft 12 and through this engagement the frame B and one side of the output circuit of the rectifier are grounded to the shaft 12.

In the preferred form of the invention, contact means 22 are provided on one side or face of frame B which I will term the front or foremost face of the frame B. In practice, the contact means 22 are formed directly on or as a part of the frame B and are in the nature of raised portions having flat, smooth faces in a plane normal to the longitudinal axis of the structure. In practice the surfaces of the contacts 22 are coated or plated with nickel, or the like, and they are polished so that they are flat and smooth.

The forward plate C of the rectifier is a flat, round, or disc-shaped plate located forward of the frame B and spaced axially therefrom. The forward plate serves as an electrical conductor in the circuit of the rectifier. In fact, it carries the insulated side of the direct current circuit put out by the rectifier and it is therefore preferably formed of metal which is a good conductor.

A connecting means D joins the peripheries of the frame B and forward plate C so that these parts are rigidly connected mechanically in a predetermined fixed relationship. In the preferred form of the invention the connecting means D involves an axial ring 30 at the periphery of the frame B and projecting forward from the periphery of the frame. A radially disposed flange 31 projects outward from the foremost end of the ring 30. An insulator 32 covers the ring 30 and the flange 31 and may, in practice, be formed of rubber or other like or suitable insulating material.

In the preferred form of the invention, the insulator is a unitary ring of insulating material having a side 35 covering the back side of the flange 31, a side 36 covering the front side of the flange 31 and projecting inwardly a substantial distance from the flange 31, while a peripheral portion 37 connects the sides 35 and 36 and extends over or around the periphery of the flange 31.

A rim 38 is provided on the periphery of the forward plate C and projects rearwardly to overlie the flange 31 and the portion of the insulator surrounding the flange 31. An inwardly projecting radially disposed lip 39 is provided on the rear end of the frame and overlies the rearmost side 35 of the insulator.

Figures 3, 4, 5:
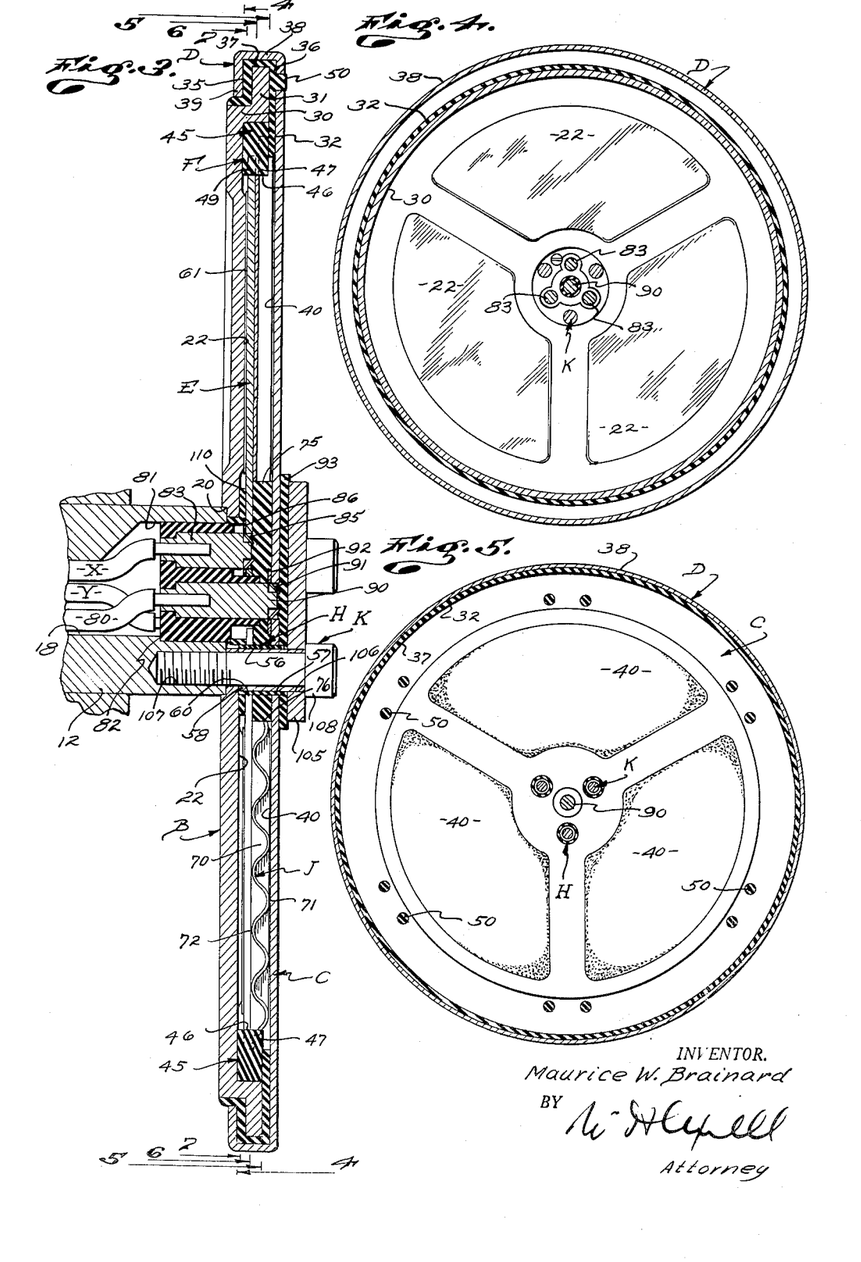
Fig. 3 is an enlarged detailed longitudinal sectional view of the rectifier, being an enlarged view taken as indicated by line 3—3 on Fig. 2.
Fig. 4 is a reduced transverse sectional view of the rectifier, being a view taken as indicated by line 4—4 on Fig. 3.
Fig. 5 is a reduced transverse sectional view of the rectifier, being a view taken as indicated by line 5—5 on Fig. 3.
Figures 6, 7, 8, 9, 10:
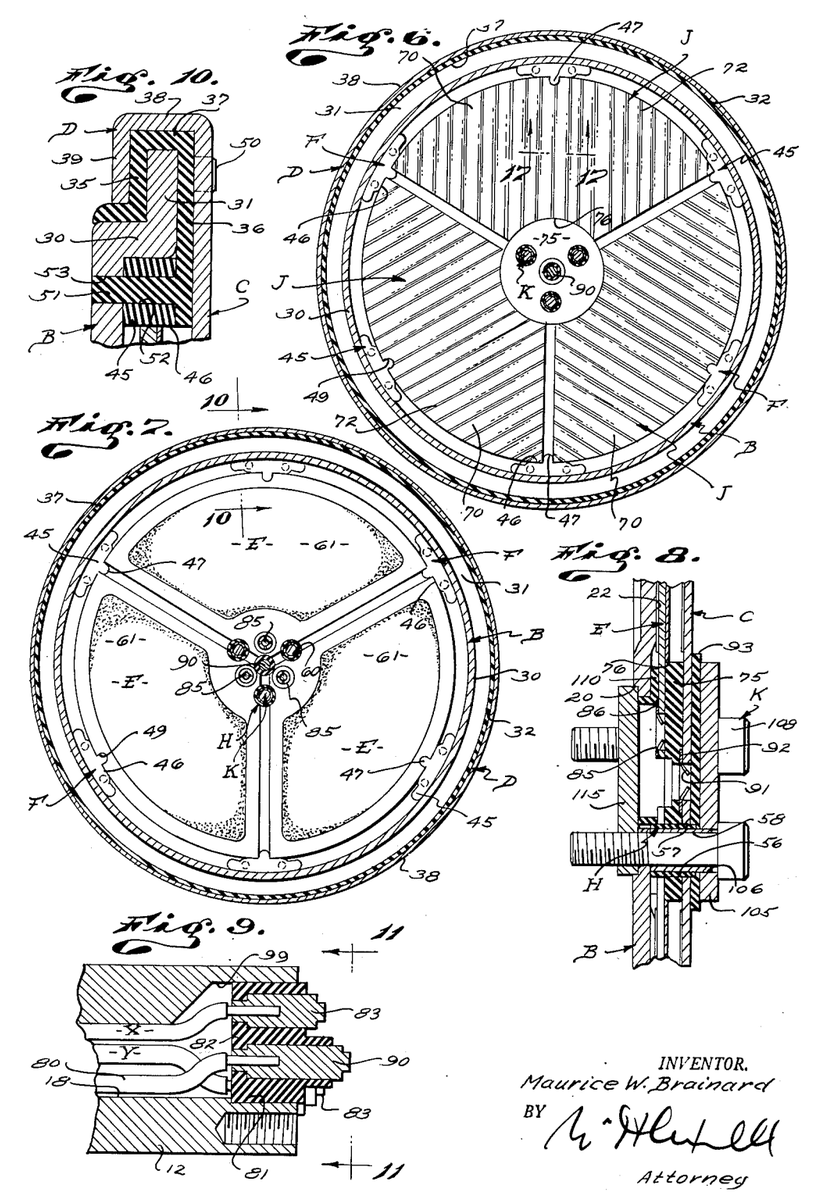
Fig. 6 is a reduced detailed transverse sectional view of the rectifier, being a view taken as indicated by line 6—6 on Fig. 3.
Fig. 7 is a reduced transverse sectional view of the rectifier taken as indicated by line 7—7 on Fig. 3.
Fig. 8 is an enlarged detailed sectional view of a portion of the central portion of the rectifier, showing it detached from the electric machine and with a sealing plate applied.
Fig. 9 is an enlarged longitudinal detailed sectional view of the end portion of the motor shaft showing contacts on the wires carried by the shaft in position ready to receive the rectifier.
Fig. 10 is an enlarged detailed sectional view taken at the periphery of the rectifier construction, being a view taken on line 10—10 on Fig. 7.

In practice the rim 38 and lip 39 are integrally joined to or formed as parts on the plate C and when the rectifier is assembled the lip is turned in by suitably working the material of the periphery of the plate C to permanently assemble the parts as illustrated in Figs. 3 and 10 of the drawings. By employing an insulator of suitable material, say of rubber, in the means D, a moisture-proof seal is established between the frame B and the plate C at the periphery of the rectifier.

A plurality of rectifying elements in the form of layers 40 which may be of selenium, or the like, is provided on the rear face of the forward plate C. The rectifying elements or layers 40 are circumferentially spaced around the central axis of the rectifier and where the rectifier is handling three-phase alternating current, as in the case being described, there are three such layers 40 adherent to plate C and these are preferably disposed substantially as shown in Fig. 5 of the drawings. Selenium is commonly and advantageously used as a material out of which rectifying elements such as the elements 40 are made. However, it is to be understood that other like or equivalent materials, such as copper oxide, magnesium copper sulphide, etc. can be used if desired. For this reason, when I use the term "selenium" or "rectifying" layer in referring to elements such as the layers 40, I mean to include any like or equivalent materials. When selenium is employed as the material out of which to form the elements 40 it may be deposited directly upon the inner side or face of the front plate C. It is to be understood, of course, that I contemplate employing construction in the rectifying elements consistent with usual or common practice, for example, when a selenium element is employed, there will be the usual barrier layer at the selenium surface. The present invention is, however, not concerned with such phases of the subject.

Circumferentially spaced or segmental plates E are provided in the rectifier between the frame B and the front plate C. The segmental plates E are preferably flat plates shaped and proportioned substantially as shown in Fig. 7 of the drawings, there being three such plates in a rectifier handling three-phase current.

In the preferred form of the invention, the segmental plates E are suitably mounted in the rectifier by an outer mounting means F and an inner mounting means H.

The outer mounting means F in its preferred form involves a plurality of blocks 45 of insulating material held within the ring 30 and suitably engaged with the peripheral portions of the segmental plates E. In the preferred arrangement the blocks 45 are spaced around the interior of the ring 30 so that each segmental plate E is engaged by a plurality of blocks. Each block is shown as having inner sides or faces 46 and has an inwardly projecting lug 47. In the arrangement illustrated blocks 45 occur between adjacent segmental plates so that the plates are separated by lugs 47, and between the blocks that separate the plates there are other blocks having their lugs engaged in peripheral notches 49 provided in the plates E.

The construction preferably includes orienting means serving to locate the essential parts in definite rotative positions relative to each other and in the preferred form of the invention this means serves to rotatively orient the frame B, the plate C and the several plates E.

In the case illustrated the desired orientation is gained through the insulator 32 incorporated in means D. The side 36 of the insulator 32 has a forwardly projecting lug 50 that enters an opening in plate C so that the insulator will fit into the structure in but one rotative position relative to the plate C. A plurality of axially disposed lugs 51 project rearwardly from the side 36 of the insulator at a point within the ring 30 and these lugs 50 extend rearwardly through openings 52 in the blocks 45. If desired, the lugs may be continued to extend into openings 53 in the frame B. Through this keying or interlocking of the parts the mechanism cannot be assembled except with the essential parts properly related.

Figures 11, 12, 13, 14, 15, 17:
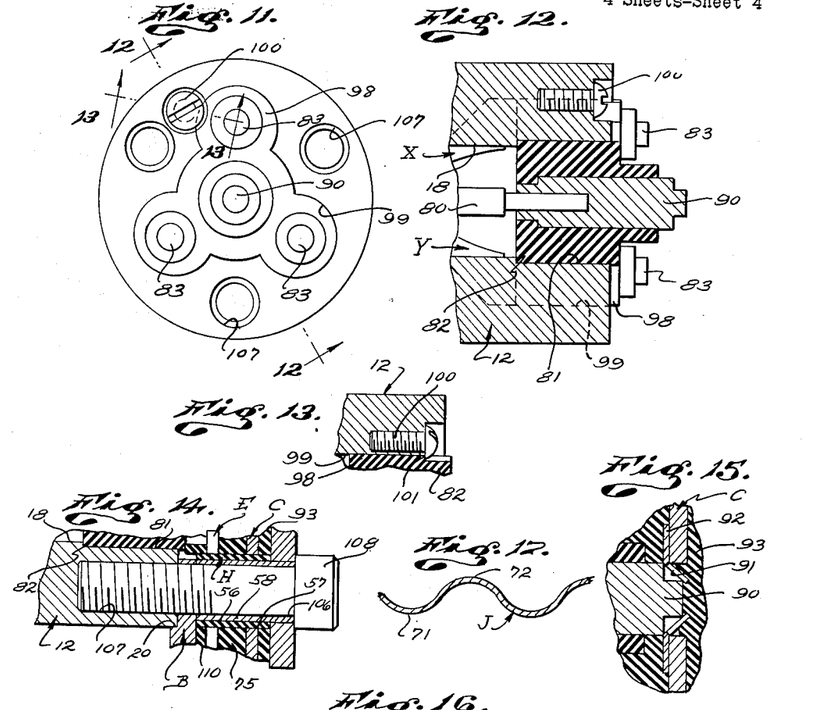
Fig. 11 is an enlarged end view of the parts shown in Fig. 9, being a view taken as indicated by line 11—11 on Fig. 9.
Fig. 12 is a detailed sectional view taken substantially as indicated by line 12—12 on Fig. 11.
Fig. 13 is a detailed sectional view taken as indicated by line 13—13 on Fig. 11.
Fig. 14 is an enlarged detailed sectional view of a portion of the structure shown in Fig. 3.
Fig. 15 is an enlarged detailed sectional view of another portion of the structure shown in Fig. 3.
Fig. 17 is an enlarged detailed sectional view of a portion of the structure shown in Fig. 6, being taken as indicated by line 17—17 on Fig. 6.
Figure 16:
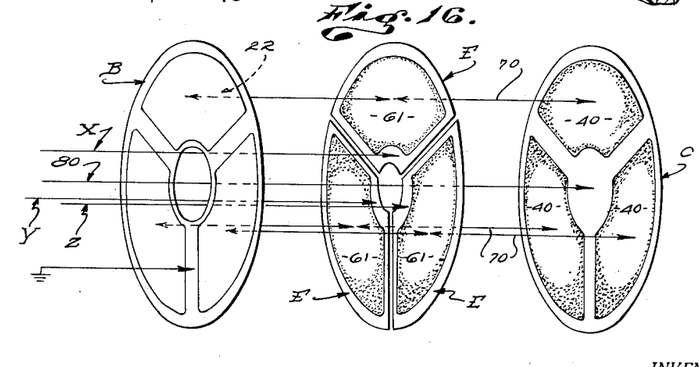
Fig. 16 is a diagrammatic view illustrating, generally, the electrical action of the rectifier.

The inner supporting means H for the plates E involves spacers 56 of insulating material that occur between the plates E as they approach the center of the rectifier. The spacers 56 extend axially so that their rearmost ends abut the forward side of the frame B while their forward end portions extend through openings 57 in the plate C (see Figs. 3, 8 and 14). The spacers 56 are tubular in form and have metal liners 58 projecting rearwardly to engage the forward face of frame B and forwardly beyond the plate C. The spacers, with their liners, are engaged in notches 60 in the side or radial edges of the segmental plate E (see Fig. 7), so that they hold the plates E against shifting radially relative to each other and they also space the plates E apart circumferentially.

Elements or layers 61 of rectifying material such as selenium, or the like, are provided on the rear or inner faces of the segmental plates E. In the preferred form of the invention, a single or continuous rectifying layer or element 61 occupies substantially the entire rear side of each plate E and the elements 61 are directly opposite and coextensive with the contacts 22 occurring on the forward side of the frame B. In the arrangement provided by the present invention, the selenium elements 61 are in direct pressure engagement with the contacts 22 of frame B, as clearly illustrated in the drawings. Through the construction above described and because of the orienting means that I have described, the rectifying elements 61 and the contacts 22 properly register when the structure is assembled and it is impossible to assemble the parts with these portions in anything other than proper engagement.

In accordance with the present invention means J electrically connects each of the rectifying elements 40 on plate C with the opposite or opposing segmental plate E. In the preferred form of the invention means J involves a contact 70 between each rectifying element 40 and its opposing segmental plate E. Each contact is preferably a sheet metal element segmental in form and corresponding generally in size and shape with the parts that it electrically connects. The metal plates forming the contacts 70 may be corrugated so that each plate has crests 71 in pressure engagement with a selenium element 40 and crests 72 in pressure engagement with a segmental plate E. The corrugations are such that the plates have the desired flexibility. In the preferred form of the invention, the segmental contact plates 70, best shown in Fig. 6 of the drawings, are spaced apart and are held against outward or radial displacement by the blocks 45, lugs 47 of blocks 45 being engaged between adjacent plates 70 and in peripheral notches 49 in the plates 70, the same as they engage the segmental plates E. At the center of the construction a central filler 75 of insulating material such as rubber, or the like, supports the innermost ends 76 of the contact plates 70 and this filler engages and insulates between the inner or central portion of the segmental plates E and the central portion of the forward plate C.

In accordance with the present invention electrical coupling means connect wires provided within the shaft 12 of the electric machine with certain of the elements of the rectifier. Input wires X, Y and Z carried in the opening 18 provided in shaft 12 are connected to the segmental plates E, one of these wires being connected to each plate. Electric current is carried from the rectifier by an outflow (negative) wire 80 carried in the opening 18 in shaft 12, and this wire is connected to the forward plate C of the rectifier. The plate C and the wire 80 carry the insulated side of the direct current circuit that extends from the rectifier to the field elements 13 of the generator.

In the preferred form of the invention a central socket 81 is provided in the end of shaft 12 that carries the rectifier and a plug 82 of insulating material, such as hard rubber, bakelite, or the like, is carried in the socket 81. Three circumferentially spaced pin contacts 83 are carried in the plug 82 and project forwardly therefrom. The pin contacts 83 correspond in arrangement with the segmental plates E and each of wires X, Y and Z is connected to one of the pin contacts, as shown in Fig. 3 of the drawings. Each segmental plate E has a flexible contact 85 in contact therewith through a tab or contact plate 86, and a portion of the contact 85 that projects radially inward is engaged by a pin contact 83. The portions of the contacts 85 engaged by the pins 83 are supported or backed up by the filler 75 so that the contacts are yieldingly held in good electrical engagement or contact with the pins 83.

A central contact pin 90 carried in the plug 82 is electrically connected to the wire 80 and projects forward from the plug to engage a contact 91 with a tab or contact plate 92 electrically contacting the plate C. A cushion 93 of rubber, or the like, held at the front of plate C by the mounting means about to be described, engages and holds the contact 91 in engagement with the pin 90. In the preferred form of the invention and in order to rotatively position or orient the contact pins 83 with reference to the plates E and the contacts 85 thereon, the plug 82 has radially projecting portions 98 that carry the contact pins 83 and these portions 98 are held in radial extension 99 of the central socket 81. A retaining screw 100 is threaded to the shaft and overlies a part of the plug at 101 so that the plug is retained in position in the end of the shaft.

The rectifier construction, as hereinabove described, is applied as a unit to the end of the shaft which carries the plug 82 with the contacts 83 and 90 therein. A suitable mounting means K releasably retains the rectifier on the shaft and in the preferred form of the invention the mounting means involves a clamp plate 105 located at the center of the rectifier and forward of the plate C. A pad or cushion 93, preferably of rubber, is arranged beneath the plate 105 or between the clamp plate and the plate C.

A plurality of screw fasteners connects the plate or extends between the plate 105 and the shaft. In the preferred construction the screw fasteners extend through openings 106 in the clamp plate and are threaded into circumferentially spaced threaded sockets 107 in the end of the shaft around the socket 81. The bolts or screw fasteners preferably extend through the metal liners 58 of the spacers hereinabove described. In practice, it is preferred that the liners 58 have their inner ends engaged with the outer face of plate B while their outer ends extend through the openings 106 in the plate 105 to be engaged by the heads 108 of the screw fasteners. Through this construction the liners of the spacers limit the extent to which the screw fasteners can be tightened or set up and, consequently, limit the extent to which the various parts at the center of the rectifier can be clamped through the action of the means K. It is preferred, in practice, to so proportion the various parts occurring at the center of the rectifier, including a sealing ring of electrical insulating material 110 between frame B and the plates E, so that when the means K is fully engaged or set up with the heads 108 tight against the liners 58, all of the parts at the center of the rectifier are tight and sealed one against the other but are not distorted or overstressed.

When the rectifier unit, as provided by the present invention, is being handled or transported, as for instance, preliminary to its being applied to the electric machine, it is preferably provided with a sealing plate 115 which takes the place of the shaft 12 and which receives the screw fasteners in the manner shown in Fig. 8. When the sealing plate 115 is in place the central portion of the rectifier is held properly assembled and, furthermore, the entire interior of the rectifier is sealed against moisture, dust, etc.

From the foregoing description it will be apparent how the rectifier assembly or unit provided by the present invention can be easily and quickly applied to the end of the shaft 12 or to any such support and, furthermore, it will be apparent that the construction and arrangement of parts that I have provided is such that the rectifier can be applied to the shaft 12 without the exercise of unusual skill or ability and without danger of improper assembly. Furthermore, the general construction and arrangement of parts entering into the rectifier is such that improper assembly of the essential parts is impossible and, therefore, the rectifier when supplied as a unit is, in effect, fool-proof.

It is to be observed that the construction as a whole is free of an excessive number of fasteners or screws and that it is also free of parts that are complicated or expensive to manufacture. The delicate parts or those subject to injury or deterioration, as by moisture, etc. are sealed or protected within the rectifier construction as a whole, and the electrical parts are so formed and related that satisfactory and efficient electrical contacts are established and maintained as the rectifier continues in use. It is important to note that the rectifier is, in effect, a flat disc-shaped structure or assembly with front and rear ends of substantial extent from which heat can readily radiate.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means connecting, electrically insulating and sealing between the central portions of the members, said last-named means being adapted for mounting on a shaft to support said rectifier, cooperating electrical elements confined between said members and between said respective means adapted to act in a rectifying circuit and including a rectifying element and a contact engaged therewith, and means completing a rectifying circuit through the said electrical elements.

2. A rectifier of the character described including, two disc-shaped members spaced apart in opposed relation, means mechanically connecting, electrically insulating and sealing the members at the peripheries thereof, said means including an axially projecting rim on one member with an inwardly projecting lip spaced from said member and a radial flange on the other member confined between the lip and the first member, cooperating electrical elements confined between said disc-shaped members adapted to act in a rectifying circuit and including a rectifying element and a contact engaged therewith, and means completing a rectifying circuit through the said electrical elements.

3. A rectifier of the character described including, two disc-shaped members spaced apart in opposed relation, means mechanically connecting, electrically insulating and sealing the members at the peripheries thereof, said means including an axially projecting rim on one member with an inwardly projecting lip spaced from said member, a radial flange on the other member confined between the lip and the first mentioned member, and an insulator electrically separating the flange and the parts adjacent thereto, cooperating electrical elements confined between said disc-shaped members adapted to act in a rectifying circuit and including a rectifying element and a contact engaged therewith, and means completing a rectifying circuit through the said electrical elements.

4. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, circumferentially spaced segmental electrical elements confined between said disc-shaped members adapted to act in a rectifying circuit and including rectifying elements and contacts engaged therewith, means completing a rectifying circuit through the said electrical elements, and orienting means locating one of said disc-shaped members and the segmental electrical elements so that the contact elements oppose the rectifying elements, said orienting means including parts on the insulator keyed to said one of the disc-shaped members and to the segmental electrical elements.

5. A rectifier of the character described including, two disc-shaped members spaced apart in opposed relation, means mechanically connecting, electrically insulating and sealing the members at the peripheries thereof, said means including a rigid mechanical connection holding the members against moving apart, and an electrical insulator sealing between and electrically insulating the members, spaced rectifying elements on the face of one member facing the other member, circumferentially spaced segmental electrical elements between said members, spacers supporting the electrical elements at the peripheries thereof and spacing them apart, orienting means locating said one member and the segmental electrical elements so that one electrical element is opposite each rectifying element, said orienting means including parts on the insulator keyed to said one member and to the spacers, and an electrical contact between each of said rectifying elements and the electrical element opposite it.

6. A rectifier of the character described including, two disc-shaped members spaced apart in opposed relation, means mechanically connecting, electrically insulating and sealing the members at the peripheries thereof, said means including a rigid mechanical connection holding the members against moving apart, and an electrical insulator sealing between and electrically insulating the members, spaced rectifying elements on the face of one member facing the other member, circumferentially spaced segmental electrical elements between said members, spacers supporting the electrical elements at the peripheries thereof and spacing them apart circumferentially, an electrical contact between each of said rectifying elements and one of the said segmental electrical elements, and means spacing and sealing the disc-shaped members and the segmental electrical elements at the central portion of the assembly.

7. A rectifier of the character described including, two disc-shaped members spaced apart in opposed relation, means mechanically connecting, electrically insulating and sealing the members at the peripheries thereof, said means including an axially projecting rim on one member with an inwardly projecting lip spaced from said member, a ring projecting axially from the other member, and a radial flange on the ring confined between the lip and the first mentioned member, spaced rectifying elements on the face of one member facing the other member, circumferentially spaced segmental electrical elements between said members, spacers of electrical insulating material within the ring and supporting the electrical elements at the peripheries thereof and spacing them apart circumferentially, and electrical contacts between said rectifying elements and the said electrical elements.

8. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means connecting, electrically insulating and sealing between the central portions of the members, cooperating electrical elements confined between said members and between said respective means adapted to act in a rectifying circuit and including a rectifying circuit through the said electrical elements, and mounting means for securing the central portion of the assembly to a shaft.

9. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means connecting, electrically insulating and sealing between the central portions of the members, cooperating electrical elements confined between said members and between said respective means adapted to act in a rectifying circuit and including means to establish a rectifying circuit through the said electrical elements, and mounting means adapted to secure the central portion of the rectifier to a shaft including a screw fastener engaged through the central portion of the rectifier and adapted to engage with the shaft.

10. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means connecting, electrically insulating and sealing between the central portions of the members, cooperating electrical elements confined between said members and between said respective means adapted to act in a rectifying circuit and including a rectifying circuit through the said electrical elements, and mounting means adapted to secure the central portion of the rectifier to a shaft including a screw fastener engaged through the central portion of the rectifier and adapted to engage with the shaft, one of said disc-shaped members having a central socket adapted to receive the end of the shaft.

11. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members and including a plurality of separate rectifying elements located on one of said disc-shaped members, a corresponding number of separated conductive plates located opposite said rectifying elements, and a contact member located between each rectifying element and the conductive plate opposite said element, and means to connect said rectifying means into an electrical circuit.

12. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members and including a plurality of rectifying elements located on one of said disc-shaped members, a corresponding number of conductive plates located opposite said rectifying elements, each of said conductive plates having a second rectifying element located thereon, and means to connect said rectifying means into an electrical circuit.

13. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members and including a plurality of rectifying elements located on one of said disc-shaped members, and a plurality of contact members located on the other of said disc-shaped members, and means to connect said rectifying means into an electrical circuit.

14. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members and including a plurality of rectifying elements located on one of said disc-shaped members, a corresponding number of contact members located on the other of said disc-shaped members, and a corresponding number of intermediate conductive plates, each of said conductive plates having a second rectifying element located thereon, and means to connect said rectifying means into an electrical circuit.

15. A rectifier of the character described including, two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members and including a plurality of separated corrugated contact members, and means to connect said rectifying means into an electrical circuit.

16. A rectifier of the character described including, two disc-shaped members spaced apart in opposite relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members and including a plurality of rectifying elements located on one of said disc-shaped members, a corresponding number of conductive plates located opposite said rectifying elements, and a corrugated contact member contacting and located between each rectifying element and the conductive plate opposite the said rectifying element, and means to connect said rectifying means into an electrical circuit.

17. A rectifier adapted to be carried by a shaft including, a rigid assembly of two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members, means to connect said rectifying means into an electrical circuit, and mounting means securing the central portion of said rigid assembly to a shaft and including a clamp plate engaging the exterior of one disc-shaped member, and screw fasteners extending through said clamp plate and said rigid assembly, said screw fasteners being adapted to engage a shaft.

18. A rectifier adapted to be carried by a shaft including, a rigid assembly of two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members, means to connect said rectifying means into an electrical circuit, and mounting means for securing the central portion of said rigid assembly to a shaft and including a clamp plate engaging the exterior of one disc-shaped member, screw fasteners extending through said clamp plate and said rigid assembly and adapted to engage said shaft, and means to limit the clamping action of said fasteners.

19. A rectifier adapted to be carried by a shaft including, a rigid assembly of two disc-shaped members spaced apart in opposed relation, means mechanically connecting, electrically insulating and sealing the members at the peripheries thereof, said means including a rigid mechanical connection holding the members against moving apart and an electrical insulator sealing between and electrically insulating the members, means to rectify electrical current, said rectifying means being located between said disc-shaped members, a core of insulating material located at the central portion of said rigid assembly, and electrical contact members carried by said core and accessible at the central portion of said rigid assembly whereby said rectifying means may be connected into an electrical circuit.

MAURICE W. BRAINARD.

References Cited in the file of this patent

UNITED STATES PATENTS

| Number | Name | Date |
|---|---|---|
| 1,898,728 | Huff | Feb. 21, 1933 |
| 2,138,160 | Hansell | Nov. 29, 1938 |
| 2,247,753 | Hansell | July 1, 1941 |
| 2,395,059 | Morris | Feb. 19, 1946 |
| 2,430,351 | Lidow et al. | Nov. 4, 1947 |
| 2,445,805 | Skinker | July 27, 1948 |
| 2,461,037 | Sell et al. | Feb. 8, 1949 |
| 2,545,863 | Sell et al. | Mar. 20, 1951 |
| 2,550,710 | Morris | May 1, 1951 |

FOREIGN PATENTS

| Number | Country | Date |
|---|---|---|
| 622,408 | Great Britain | May 2, 1949 |